July 13, 1954      E. W. ANDERSON      2,683,284

DISPENSING APPARATUS FOR MOLDABLE MATERIAL

Filed April 27, 1951      6 Sheets-Sheet 1

Eric W. Anderson,
Inventor.
Koenig and Pope,
Attorneys.

July 13, 1954 E. W. ANDERSON 2,683,284
DISPENSING APPARATUS FOR MOLDABLE MATERIAL
Filed April 27, 1951 6 Sheets-Sheet 3
FIG. 3.
FIG. 7.
FIG. 8.
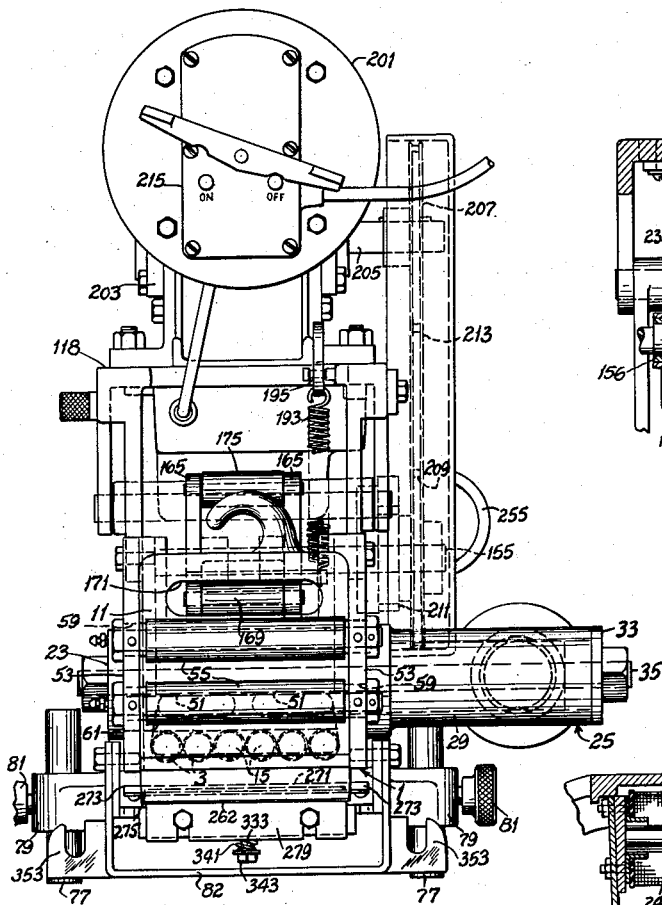
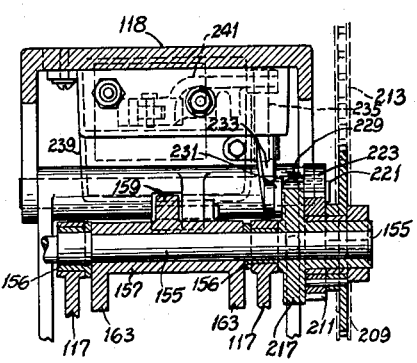
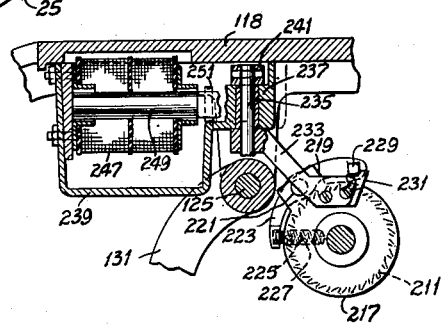
Eric W. Anderson,
Inventor.
Koenig and Pope,
Attorneys.

July 13, 1954  E. W. ANDERSON  2,683,284
DISPENSING APPARATUS FOR MOLDABLE MATERIAL
Filed April 27, 1951  6 Sheets-Sheet 4

Eric W. Anderson,
Inventor.
Koenig and Pope,
Attorneys.

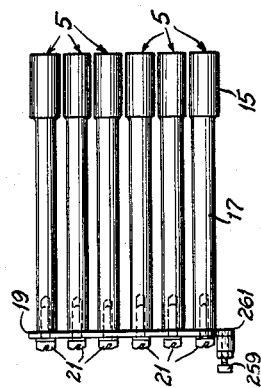

July 13, 1954     E. W. ANDERSON     2,683,284
DISPENSING APPARATUS FOR MOLDABLE MATERIAL
Filed April 27, 1951                 6 Sheets-Sheet 6
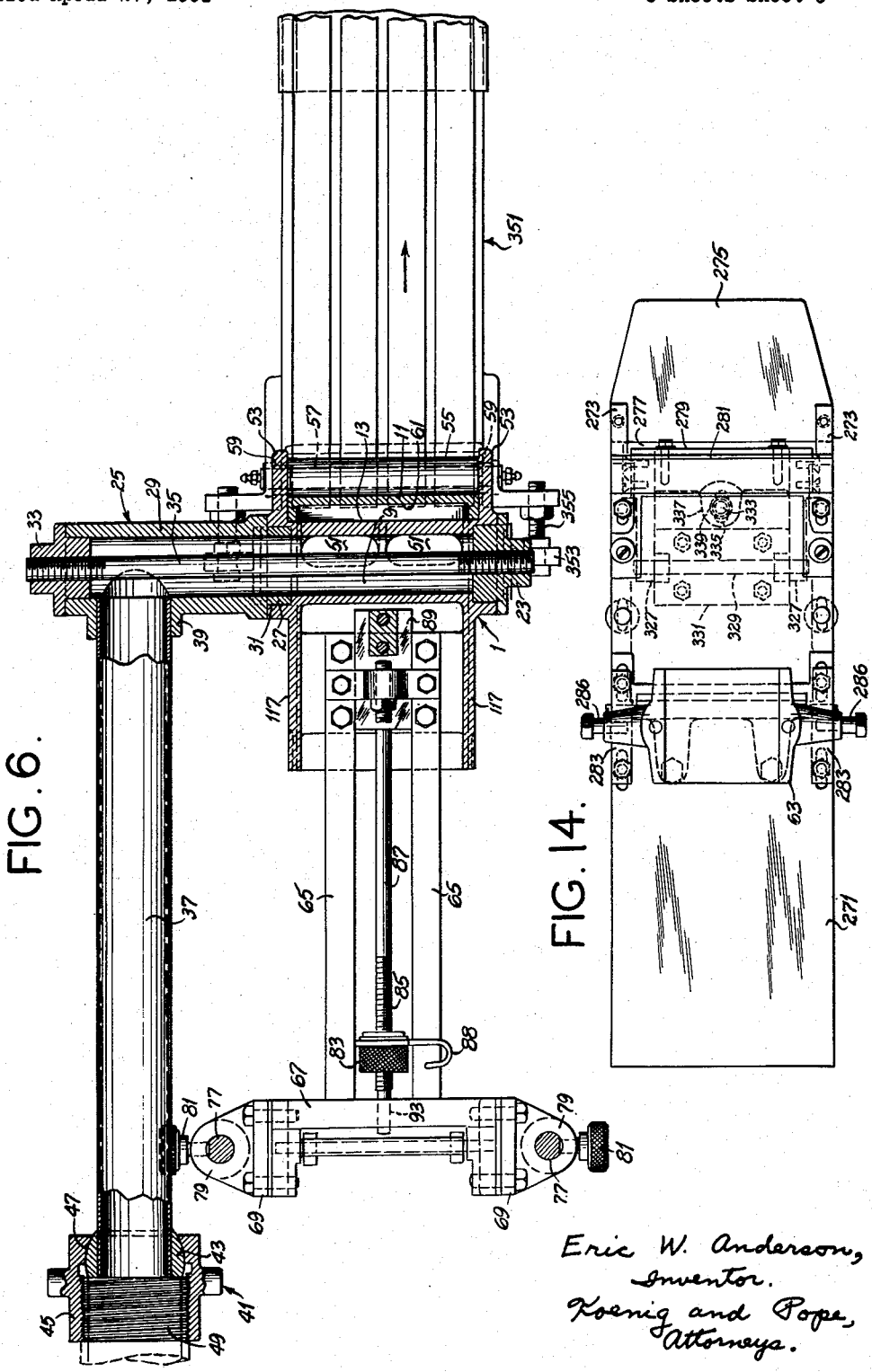
Eric W. Anderson,
Inventor.
Koenig and Pope,
Attorneys.

Patented July 13, 1954

2,683,284

UNITED STATES PATENT OFFICE 2,683,284

DISPENSING APPARATUS FOR MOLDABLE MATERIAL

Eric W. Anderson, Chicago, Ill., assignor to Dohm and Nelke, Inc., St. Louis, Mo., a corporation of Missouri Application April 27, 1951, Serial No. 223,336

24 Claims. (Cl. 17—32)

This invention relates to dispensing apparatus for moldable material, and more particularly to apparatus of this class for molding and dispensing sausage meat in link form.

The invention is an improvement upon the dispensing apparatus disclosed in my copending application entitled Dispensing Apparatus for Moldable Material, Serial No. 177,419, filed August 3, 1950. In said copending application, I have disclosed a manually controlled apparatus particularly for dispensing sausage meat in the form of link sausages ready for packaging without sausage casings, the apparatus being adapted generally for the dispensing of moldable material other than sausage meat. The object of this invention is the improvement of the apparatus disclosed in said copending application to provide an apparatus which functions to dispense more perfectly formed uniform-weight skinless sausages; which acts automatically, without requiring any manual control other than control of the rate of supply of sausage meat; which is adapted readily to be connected to a conventional sausage stuffer; which is adapted, upon each cycle of operation, to deliver a quantity of sausages on a piece of paper to a conveyor ready for packaging, without any distortion of the sausages; which operates at a rate dependent upon the rate of supply of sausage meat thereto; and which is capable of a high rate of production and reliable in operation. It will be understood that the principles of this invention are applicable to the dispensing of moldable material in general, not being limited to the dispensing of sausage meat. Other features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, Fig. 1 is a plan view of a dispensing apparatus of this invention, parts being broken away;

Fig. 2 is a side elevation of the apparatus;

Fig. 2-A is an enlarged view similar to Fig. 2 partly in side elevation and partly in vertical longitudinal section, and with parts broken away;

Fig. 3 is a front end view, as viewed from the right of Fig. 2;

Fig. 5 is a vertical longitudinal section taken substantially on line 5—5 of Fig. 1, illustrating parts in moved positions;

Fig. 6 is a horizontal longitudinal section taken substantially on line 6—6 of Fig. 5, with parts omitted;

Fig. 7 is a fragmentary vertical transverse section taken substantially on line 7—7 of Fig. 1;

Fig. 8 is a fragmentary vertical longitudinal section taken substantially on line 8—8 of Fig. 1;

Fig. 12 is a plan view of a plunger assembly per se;

Fig. 13 is an end view of the plunger assembly as viewed from the left of Fig. 12; and, Fig. 14 is a horizontal longitudinal section taken substantially on line 14—14 of Fig. 5.

Similar reference characters indicate corresponding parts throughout the several views of the drawings.

Figure 1:
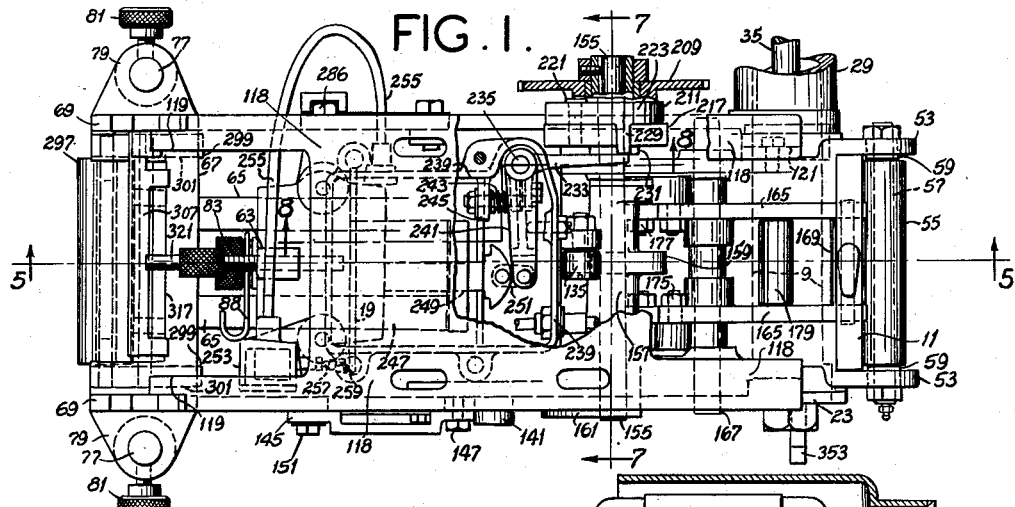
Figure 2:
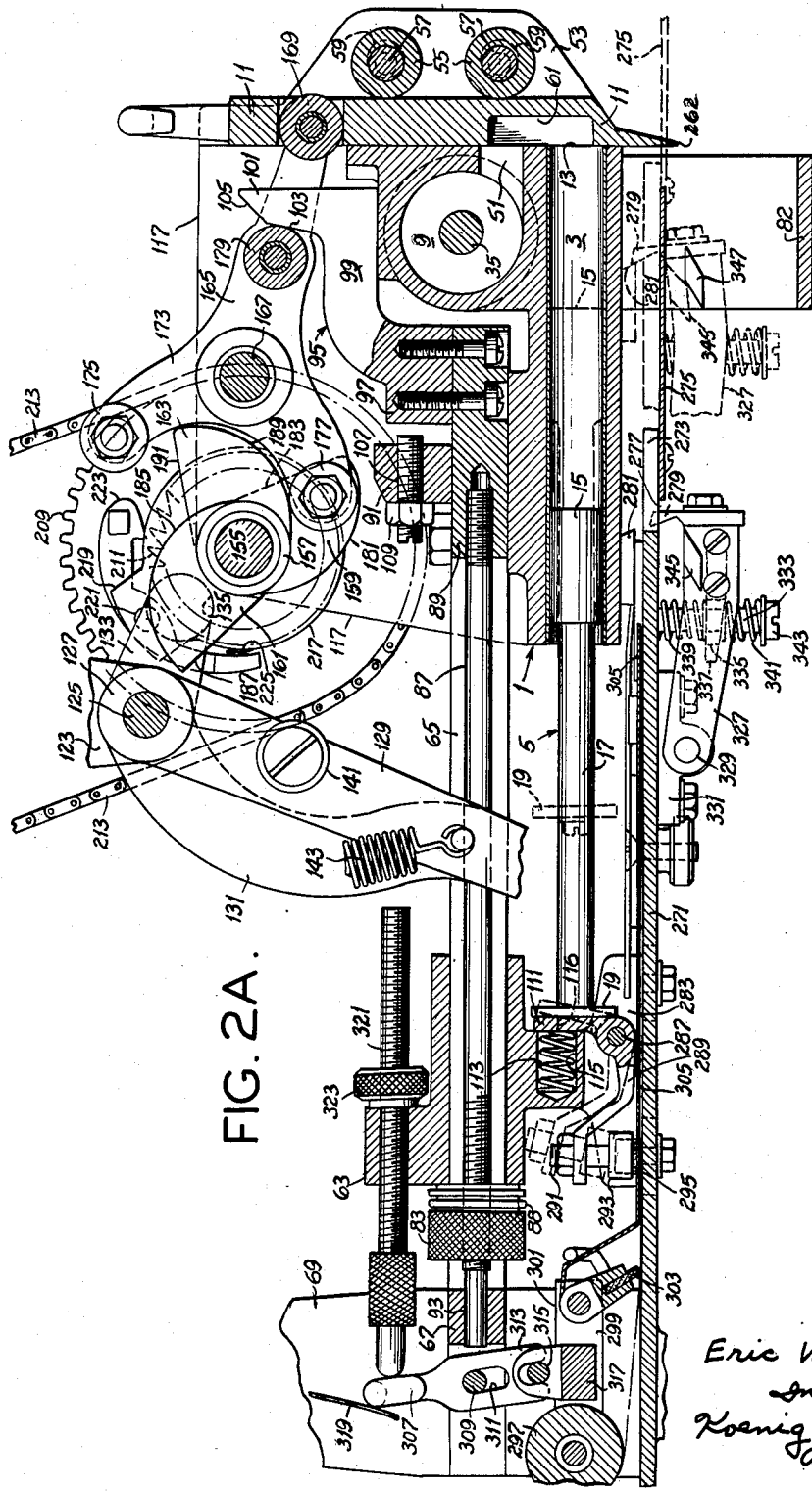
Figure 4:
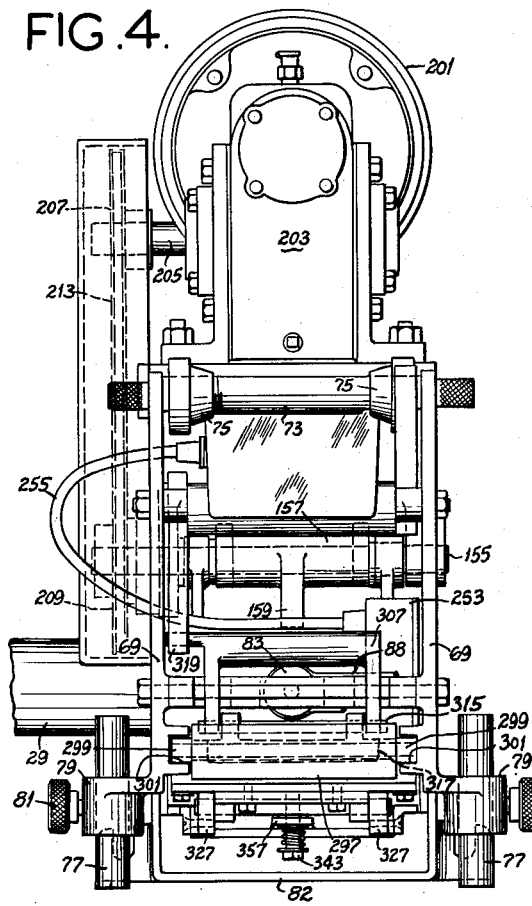
Fig. 4 is a rear end view, as viewed from the left of Fig. 2.

Referring to the drawings, a specific embodiment of the dispensing apparatus of this invention particularly for molding and dispensing sausages is shown to comprise a mold 1 having six cavities 3, each of link sausage form, for molding sausage meat into link sausages without sausage casings. Each cavity, as shown, is of elongate cylindrical form, having the diameter desired for the sausages to be dispensed, and a length somewhat longer than the longest sausage which is to be dispensed. The cavities are arranged horizontally side-by-side and parallel to one another in the mold, and extend completely through the mold from its rearward end (its left end as illustrated in Figs. 1, 2, 2-A and 5) to its forward end. Reciprocable in each cavity is a discharge plunger 5, for discharging a sausage molded in a cavity through its forward discharge end at the forward end of the mold. The cavities are adapted to be filled with sausage meat under pressure from a manifold supply chamber 9 formed in the mold adjacent its forward end, flow of sausage meat from the chamber to the cavities being controlled by mold-filling means comprising a head 11 which is vertically slidable on the flat vertical forward face 13 of the mold.

As more particularly illustrated in Fig. 12, each of the plungers 5 is formed to have a piston portion 15 at its forward end having a close sliding fit in its respective cylindrical mold cavity, this piston portion being at the forward end of a rod portion 17 which is of reduced diameter as regards the piston portion. By having the piston portions at the forward ends of the reduced diameter rod sections, only a minor portion of the length of each plunger is in sliding engagement with the interior wall of its cavity so as to avoid sticking of the plunger in the cavity such as might otherwise occur due to leakage of sausage meat between the plunger and the internal wall of the cavity. The plungers are connected together in the proper spaced parallel relation by a cross bar 19 extending across the rearward ends of their rod portions 17, with screws 21 extending through the cross bar into the ends of the rod portions.

The chamber 9 is conveniently formed as a transverse cylindrical bore extending through the mold from one side to the other above the forward ends of the cavities 3. One end of the chamber 9 (the end seen in Fig. 2) is closed by a plug 23. At 25 is shown a T-fitting which has a reduced extension 27 at one end of its head poriton 29 rotary in a counterbore 31 in the other end of the chamber 9. The other and outer end of the head portion 29 of the T-fitting is closed by a plug 33, on which the head portion is rotary. The plugs 23 and 33 are tied together by a rod 35 extending axially through the chamber. A length of tubing or pipe 37 forming a rigid conduit has one end soldered in the stem 39 of the T-fitting, the pipe thereby extending radially from the head portion of the fitting. On the other end of the pipe is a universal-joint-type coupling generally designated 41. This consists of a ball segment 43 on the end of the pipe, and a fitting 45 having a ball-socket 47 at one end by means of which the fitting 45 can partake of universal movement on the segment 43, the fitting being internally screw threaded at its other end as indicated at 49 for connection to the outlet (indicated in dotted lines) of the cock (not shown) of a conventional air pressure operated sausage stuffer (also not shown). The sausage stuffer is of a type which is adapted to discharge sausage meat at high pressure through the cock, and thence through the pipe 37, and is not particularly described herein as such machines are well-known in the art. With the T-fitting and pipe or conduit 37 adapted to swivel around the axis of the chamber 9, and with the universal-joint-type coupling at the end of the conduit, the dispensing apparatus of this invention is adapted to be mounted on tables at different elevations relative to the stuffing machine, without imposing any difficulty in the way of making the connection between the stuffing machine and the chamber 9. Also, the construction is such that the T-fitting may be used at either end of the chamber 9. Two elongate horizontal slots 51 open from the chamber 9 through the forward face 13 of the mold, providing discharge ports from the chamber.

The head 11 consists of a plate guided for vertical sliding movement on the forward face of the mold by side guides 53 formed integrally with the mold, and held in the guides in sealing relation against the forward face of the mold by rollers 55 located between the side guides. As shown, each of these rollers is rotary on a shaft 57 the ends of which are eccentrically mounted in bushings 59 which are rotary in the side guides 53, whereby the rollers may be adjusted to maintain pressure engagement with the head 11 as wear occurs. In the face of the head 11 toward the mold face 13 is a valve cavity 61, making the head a D-valve, the vertical dimension of the valve cavity corresponding to the vertical spacing of the slots or ports 51 and the mold cavities 3. As shown in Fig. 3, the distance from the outer end of one slot 51 to the outer end of the other is somewhat less than the widthwise distance between two outermost mold cavities 3, and the cavity 61 widens in downward direction to the widthwise spacing of the two outermost mold cavities. The head or valve member is movable between the raised retracted position shown in Fig. 5 wherein the discharge ends of the mold cavities 3 are completely unblocked, and wherein the slots 51 are blocked by the lower end portion of the member 11, and the lowered mold-filling position shown in Figs. 2 and 2-A wherein it not only closes the discharge ends of the mold cavities but also establishes communication from the chamber 9 through the slots 51 and the valve cavity 61 to the discharge ends of all six mold cavities 3.

A carriage 63 is guided for reciprocation toward and away from the rear end of the mold in axial direction as regards the cavities 3 and the plungers 5 by a pair of guide bars each of which is designated 65. These guide bars are fixed at their forward ends to the top of the mold, and extend rearward from the mold in spaced parallel relation in a generally horizontal plane. At their rearward ends, the bars 65 are fixed to a horizontal cross frame member 67 which is secured in position between two vertical pedestals 69 for holding a roll R of suitable packaging paper, such as parchment paper. The pedestals have bearings 71 at their upper ends for journalling a roll-holding shaft 73 with its axis above the level of and transverse to the axes of cavities 3. On the shaft 73 are spacers 75 for centering the roll R. The pedestals are carried by legs 77, which are vertically adjustable in sleeves 79 at the lower ends of the pedestals. Set screws 81 are provided to hold the legs in adjusted position. Legs 77 are so adjusted in relation to the base for the apparatus and to a U-shaped mold support 82 that the apparatus is mounted with the cavities generally horizontal.

The carriage 63 is slidable on the bars 65 in a horizontal plane, and longitudinally as regards the cavities and the plungers, between a retracted position and the advanced position illustrated in Fig. 5. The retracted position of the carriage is determined by its engagement with an adjustably positioned stop comprising a nut 83 adjustably threaded on a threaded portion 85 of a rod 87 which extends longitudinally of the apparatus between the bars 65 and through an opening in the carriage. A spring detent for holding the nut in adjusted position is indicated at 88. The forward end of the rod 87 is fixed in a block 89 which has a sliding fit between the bars 65 on the top of the mold, and which is adapted for longitudinal sliding movement on the top of the mold. The bars 65 restrain the block from sidewise movement, and the block is held down by a transverse bridge member 91 extending transversely across the top of the block and fastened at its ends to the bars. The rearward end of the rod 87 is slidable in an opening 93 in the cross frame member 67. Fixed to the top of the block 89 forward of the bridge member 91 is a meat expansion control element, generally designated 95. This has a base portion 97 fixed to the top of the block, a forwardly extending horizontal arm 99 sliding on the top of the chamber portion of the mold, and an upwardly extending cam finger 101 at the forward end of the arm 99 having a rearwardly facing cam edge 103 which has a slight forward and upward incline, ending in a more inclined cam edge 105. Rearward movement of the block 89 and the meat expansion element 95 thereon is limited by the engagement of the rearward end of the base portion 97 of the meat expansion element 95 with a stop screw 107 adjustably threaded in the bridge member 91 and locked in position by a lock nut 109.

An abutment 111 is carried by and beneath the carriage for rocking movement on a transverse axis. The abutment extends upward from its pivot, and is biased to rock in a clockwise direction as viewed in Figs. 2, 2-A and 5 by a compression spring 113 lodged in a spring recess 115 in the carriage. The abutment has a slot 116 to accommodate the heads of the screws 21. The plungers 5 are generally of exactly the same length as the cavities 3, as measured from the forward face of the cross bar 19 to the forward ends of the piston portions 15 of the plungers. The advanced position of the carriage 63 is determined by engagement of the abutment 111 with the cross bar 19, and the engagement of the cross bar 19 with the rearward end of the mold 1. In this advanced position, the forward end faces of the plungers 5 are at the forward face 13 of the mold (see Fig. 5).

The mold has integral vertical side members 117. Above the mold is a horizontal platform 118. This has side extensions 119 at its rearward end fixed to the pedestals 69, and legs 121 at its forward end fixed to the mold side members 117. A pair of bracket arms 123 extend down from the sides of the platform rearward of the mold. A shaft 125 has its ends fixed in the lower ends of these arms 123. Rotary on this shaft is a sleeve 127. Formed integrally with the sleeve and extending generally radially from its ends are lever arms 129 and 131 (see particularly Figs. 2, 2-A, 5 and 11). Arm 129 is on the side of the apparatus viewed in Figs. 2 and 2-A, and arm 131 is on the other side. An arm 133, this being relatively short, extends generally radially from the sleeve 127 just to one side of the center of length of the sleeve toward the forward end of the apparatus and carries a cam follower roller 135 at its free end. The lower ends of the arms 129 and 131 are connected to the carriage by links 137 and 139, respectively. The arm 129 carries a cam follower roller 141 on the outside (see Figs. 2, 2-A, and 11). The lever arms 129 and 131 are biased to swing in clockwise direction as viewed in Figs. 2 and 2-A by a tension spring 143 connected at one end to the arm 129 near its lower end, and connected at its other end in a hole 144 in a spring tension adjusting member 145 (see Figs. 1 and 2). Member 145 is pivoted at 147 on the side of the platform 118, and has an arcuate slot 149 at its other end. A screw 151 extending through this slot into the side of the platform holds the member 145 in various positions of angular adjustment. A number of holes 144 are provided along the length of the member 145 to allow for connection of the upper end of the spring 143 at various points to obtain various spring tensions. It will be seen that a wide variation of spring tension is allowed by reason of the member 145 being angularly adjustable and by reason of the provision of the holes 144.

A cam shaft 155 is journalled in bearings 156 in the mold side members 117. On this shaft is fixed a sleeve 157 provided with a carriage-advancing cam 159, a carriage-retracting cam 161, and a pair of duplicate cams 163 for operating the head or slide valve 11. A pair of slide valve operating levers 165 are pivoted on a transverse shaft 167 which is fixed at its ends in the mold side members 117. Levers 165, at their forward ends, carry a roller 169 which fits in an opening 171 in the valve head member 11. Levers 165, at their rearward ends on the other side of the pivot from the roller 169, are forked as indicated at 173, and have upper and lower cam follower rollers 175 and 177, respectively, on the arms of the forks. The carriage-advancing cam 159 is engageable with the cam follower roller 135 on the arm 133. The carriage-retracting cam 161 is engageable with the cam follower roller 141 on the arm 129. The duplicate slide valve operating cams 163 are engageable with the cam follower rollers 175 and 177 to operate levers 165. Levers 165 carry a roller 179 engageable behind the cam edge 103 of the finger 101.

The cam shaft 155 is adapted to be driven by a power-operated drive, including a one-revolution cluch mechanism to be described, in clockwise direction as viewed in Figs. 2, 2-A and 5. The cams 159, 161 and 163 are so developed and phased as to effect reciprocation of the carriage 63 through one complete cycle consisting of a forward stroke and a rearward stroke and to effect operation of the slide valve 11 through one complete cycle consisting of a lifting and lowering of the valve, all in proper timed relation, upon each revolution of the cam shaft. Referring to Fig. 5, illustrating the position of the carriage 63, the plungers 5, the lever arms 129 and 131, the levers 165 and the slide valve 11 at about the mid-revolution position of the cams (the end of a forward or advancing stroke of the carriage), it will be seen that the forward ends of the plungers 5 are at the forward face 13 of the mold 1, and the slide valve 11 is lifted so that the forward ends of the cavities 3 in the mold are open. The carriage-advancing cam 159 has a rise 181, and this rise is just riding out of engagement with the cam follower roller 135. The rise 181 is followed by a sharp drop 183, to allow for retraction of the carriage during the interval in which the cam is rotating through the angle from the trailing end of the rise 181 to the leading end of the rise 181. The carriage-return cam 161 has a rise 185 which is about to come into engagement with the cam follower roller 141 on the lever arm 129. The cam 161 has a sharp drop 187. Each slide valve actuating cam 163 has a rise 189 and a drop 191, and each rise 199 is about to come into engagement with the upper cam follower rollers 175 and about to rock the levers 165 clockwise as illustrated in Fig. 5, thereby to drive the slide valve 11 downward to its lowered position wherein it closes the open ends of the cavities in the mold and establishes communication from the chamber 9 to the cavities.

As the cams continue to rotate from their mid-cyle position shown in Fig. 5, the rise 185 of the carriage-return cam 161 comes into engagement with the cam follower roller 141 on the lever arm 129 and swings the lever arms 129 and 131 clockwise from their Fig. 5 position, thereby pushing the carriage 63 rearward. This action continues until the tension spring 143 takes over and continues the retracting movement of the carriage until the carriage engages the stop nut 83. Also, concurrently with the initiation of the return of the carriage, the rise portions 189 of the slide valve actuating cams 163 engage the upper follower rollers 175, and swing the levers 165 clockwise as viewed in Fig. 5, thereby acting to drive the slide valve 11 downward to its lowered position illustrated in Figs. 2 and 2-A, wherein the slide valve 11 closes the open ends of the cavities 3 in the mold, and establishes communication from the chamber 9 through the cavity 61 to these ends of the cavities so that meat flows from the chamber into the cavities. The spring 143 effects a quick retraction of the carriage. Following the retraction of the carriage, as the cam shaft continues rotation, the rise portions 189 of the slide valve actuating cams 163 ride off the upper follower rollers 175, and then come into engagement with the lower follower rollers 177. This rocks the levers 165 counterclockwise from their position shown in Figs. 2 and 2-A, and this raises the slide valve 11 to its lifted position as illustrated in Fig. 5. A tension spring 193 (see Figs. 2 and 3) has one end connected to the levers 165 and its other end connected to the platform 113 as indicated at 195, to bias the levers 165 to rock in counterclockwise direction, thereby to provide a positive force tending to hold the slide valve 11 in its lifted position.

When the levers 165 are in their slide valve lowering position of Figs. 2 and 2-A, the roller 179 is in a lowered position engaging the cam edge 103 on the member 95. This holds the member 95, the block 89, the rod 87 and the stop 83 in a forward position. As the levers 165 rock counterclockwise from their Fig. 2 position, the roller 179 is raised from behind the finger 101, thereby releasing the member 95 to enable the member 95, block 89, the rod 87 and the stop 83 to move rearward at least to the extent permitted by the stop screw 107.

The drive for the cam shaft includes an electric motor 201 carried by the platform. The shaft of the motor is coupled to the input shaft of a speed reducer 203 also mounted on a platform. On the output shaft 205 of the speed reducer is a sprocket 207. Rotary on one end of the cam shaft 155 is a sprocket and ratchet assembly, the sprocket of this assembly being designated 209 and the ratchet being designated 211. This assembly can rotate freely on the cam shaft. An endless chain 213 is trained around the sprockets 207 and 209. While the apparatus of this invention is being used, the motor is constantly energized and the sprocket-ratchet assembly is continuously driven. A manual motor switch is indicated at 215.

The ratchet 211 is an element of the one-revolution clutch mechanism previously referred to. This one-revolution clutch mechanism further includes a disk 217 fixed to the cam shaft and positioned at the inner side of the ratchet 211. This disk has a projecting lobe 219 carrying a pivot 221 for a pawl 223. The pivot extends outward from the lobe in axial direction and is positioned radially outward of the periphery of the ratchet. The pawl is disposed peripherally with respect to the ratchet 211 and is biased toward engagement with the ratchet by a compression spring 225 lodged in a spring recess 227 in the disk. A finger 229 projects from the inner side of the pawl inward past the disk. This finger is adapted to engage a pawl lifting element 231 at the end of a lever arm 233 mounted for swinging movement on a vertical axis under the platform. As best illustrated in Figs. 1, 7 and 8, the lever arm 233 is carried by a stud 235, rotary in a vertical bearing 237 in a wall of a housing 239 secured to the bottom of the platform 113. A lever arm 241 is secured to the upper end of the stud within the housing. This extends generally at right angles to the lever arm 233. Lever arms 241 and 233 are biased to rock counterclockwise as viewed in Fig. 1 by a compression spring 243 interposed between an abutment 245 formed as a part of the wall of the housing and an abutment on the lever arm 241. Within the housing is a solenoid 247 having a plunger 249 linked as indicated at 251 to the end of the lever arm 241, arranged to swing arm 241 clockwise against the bias of the spring 243 when the solenoid is energized.

When the solenoid 247 is deenergized, the spring 243 holds the lever arm 233 in a position wherein element 231 is interposed in the path of the finger 229. Element 231 is so formed as to lift the pawl 223 out of engagement with the ratchet 211 when the finger, rotating around with the disk, comes into engagement therewith (see Fig. 8). When the solenoid 247 is energized, the lever arms 241 and 233 are rocked clockwise as viewed in Fig. 1 against the bias of spring 243. This has the effect of retracting the element 231 from the path of the finger 229, whereupon the pawl 223 is released for engagement with the ratchet 211. Thereupon the ratchet (which it will be remembered is continuously rotating) acts through the pawl to drive the disk and this rotates the cam shaft clockwise as viewed in Figs. 2 and 2-A. Upon the completion of one revolution of the disk, assuming that the solenoid has meanwhile been deenergized so that lever 233 is released for return by the spring 243 to the position wherein element 231 is in the path of the finger 229, the finger engages the element 231, and is thereby lifted out of engagement with the ratchet, whereupon rotation of the disk and the cam shaft is arrested.

The solenoid 247 is connected in a circuit including a momentary contact switch 253 carried by the carriage 63. A flexible wiring connection between the switch and the solenoid is indicated at 255. This connection is long enough to permit full movement of the carriage. The switch has an operating button 257 projecting from its case in the direction toward the mold 1. This button is adapted for engagement by a screw 259 threaded in an arm 261 which projects from one corner of the cross bar 19. The switch is normally open, and is closed when the screw depresses the operating button.

Figs. 2 and 2-A illustrate the above described parts in the position they occupy just prior to the completion of the molding of sausages in the mold cavities 3. The slide valve 11 is in its lowered position wherein communication is established from the chamber 9 through the slots 51 and the cavity 61 to the forward ends of the cavities. The roller 179 is in engagement with the cam edge 103 on the rearward side of the finger 101, and is holding the member 95, the block 89, the rod 87 and the stop nut 83 in forward position. Finger 229 on the pawl 223 is in engagement with the element 231 as indicated in Fig. 8, and the cam shaft is at rest in the position shown in Figs. 2 and 2-A wherein the rise portions 189 of the slide valve actuating cams 163 are in initial engagement with the lower cam follower rollers 177, and the rise 181 of the carriage-advancing cam 159 is in position approaching engagement with the cam follower roller 135. Carriage 63 is held back in retracted position against the stop nut 83 by the action of the spring 143. The carriage-retracting cam 161 is in such position clear of the cam follower roller 141 as to allow for forward movement of the carriage from its retracted position. Sausage meat (not shown) has entered the cavities 3 from the chamber 9 through the slots 51 and the cavity 61, having entered the cavities 3 through their forward ends, and the meat has pushed back the plungers 5 to the position shown in Figs. 2 and 2–A wherein the switch-actuating screw 259 is in initial engagement with the button of the switch 253, but has not yet pushed in the button.

Upon a slight further rearward movement of the plungers 5, the screw 257 operates the button of the switch, and the solenoid 247 is energized. This swings the levers 241 and 233 clockwise as viewed in Fig. 1, and retracts the pawl-control element 231 from the finger 229. Thereupon the pawl 223 is pivoted by the pawl spring 225 into engagement with the ratchet 211, and, upon engagement of the pawl with the ratchet, the ratchet drives the disk 217 and the cam shaft 155 on which the disk is fixed in clockwise direction as viewed in Figs. 2 and 2–A. As the cam shaft rotates, the rise portions 189 of the slide valve actuating cams 163 engage the lower rollers 177, and rock the levers 165 counterclockwise as viewed in Figs. 2 and 2–A. This raises the slide valve 11, opening the forward ends of the cavities 3. This opening, however, does not occur until after the roller 179 has moved up from behind the finger 101, thereby freeing the rod 87 for rearward movement. The pressure of the meat in the cavities thereupon moves the plungers rearward to allow for expansion of the meat in the cavities, with release of pressure. It will be noted that when the roller 179 moves upward from behind the finger 101, and thus releases the rod 87, the effect is to allow the stop screw 83 to move rearward. This permits the carriage 63 to move somewhat further rearward, and consequently permits the plungers to move rearward. This action occurs as the slide valve is being moved upward and as it passes through an intermediate position in which it both cuts off flow of meat to the cavities and also blocks their forward ends. This is important because in order to allow for release of pressure in the cavities, the meat therein must not be subject to the pressure in the chamber 9. It will be understood that the mold cavities 3 are blocked off from the chamber 9 when the bottom edge of the cavity 61 is raised above the upper level of the mold cavities 3, and the forward ends of the cavities are not unblocked until the lower edge 262 of the valve 11 completely clears the cavities. This allowance for meat expansion before the cavities are opened, to relieve the pressure, is of utmost importance because if the cavities are opened without relieving the pressure, meat is forced out and forms an objectionable bulbous end on each sausage.

The cam shaft continuing to rotate, the rise 181 of the carriage-advancing cam 159 comes into engagement with the cam follower roller 135. This swings the lever arms 129 and 131 counterclockwise from their positions shown in Figs. 2 and 2–A and pulls the carriage 63 forward. As the carriage is pulled forward, it pushes the plungers 5 forward so that they eject the bodies of meat from the mold cavities 3 through the forward ends of these cavities, which are now open, the slide valve 11 having been raised. An intermediate position of the plungers is shown in dotted lines in Fig. 2–A. The carriage moves forward to the position shown in Fig. 5, and the plungers are driven forward to the position where their forward ends are substantially coplanar with the flat forward face 13 of the mold 1. At this time, the cam shaft 155 and the cams thereon have rotated through 180° from their position shown in Fig. 2.

As the cam shaft and cams continue to rotate clockwise from the Fig. 5 position, the rise 185 of the carriage-retracting cam 161 comes into engagement with the cam follower roller 141 on the lever arm 129, and this swings the lever arms 129 and 131 clockwise from the position shown in Fig. 5 and thereby initiates the retracting movement of the carriage. After the carriage has been retracted to the extent consistent with the development of the cam, and the tension of the spring 143, the spring takes over and completes the return movement of the carriage. As the carriage returns to its retracted position, it moves the switch 253 away from the switch-operating screw 259, and the switch opens. This deenergizes the solenoid 247, whereupon the spring 243 returns the lever 233 carrying the pawl-control element 231 to its operative position for engagement by the finger 229. The plungers 5 remain in the position shown in Fig. 5. When the cam shaft has completed one revolution, the finger 229 engages the element 231, whereupon rotation of the cam shaft is arrested as previously described.

The apparatus includes means for feeding the end of a strip of paper P from the roll R under the sausages being ejected by plungers 5 from the cavities 3 into position to receive the sausages, and for cutting off the end of the paper strip upon each sausage-ejecting operation. As shown, this means comprises a platen 271 carried by the carriage 63 for reciprocation in a horizontal plane spaced somewhat below the bottom of the mold 1. The platen is slightly narrower than the transverse spacing of the pedestals 69 and of such length and fixed to the carriage in such position that when the carriage is in its advanced position (Fig. 5), the forward end of the platen is closely adjacent the forward end of the cavities 3 and the rearward end of the platen is between the pedestals. At the forward end, the platen has side extensions 273. These carry an apron 275 extending forward from the platen, with a space 277 between the forward end of the platen and the rearward end of the apron accommodating a knife 279 mounted to move upward from a retracted position below the platen through the space 277 to cut off the paper in conjunction with a horizontal blade 281 fixed to and spaced above the platen.

Figure 9:
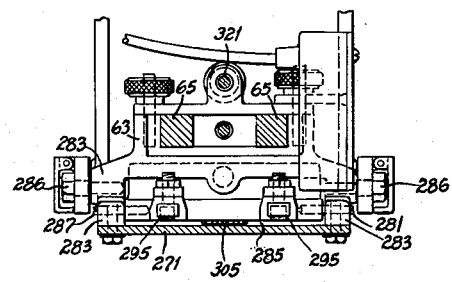
Fig. 9 is a fragmentary vertical transverse section taken substantially on line 9—9 of Fig. 2.
Figure 10:
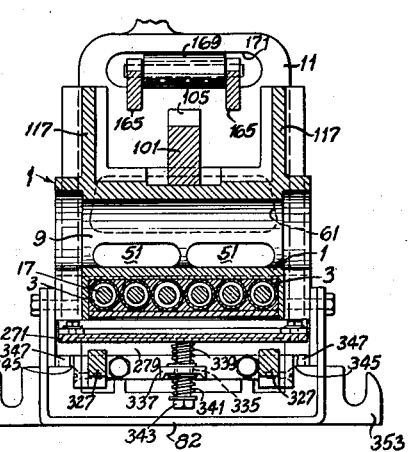
Fig. 10 is a fragmentary vertical transverse section taken substantially on line 10—10 of Fig. 5, parts being omitted.
Figure 11:
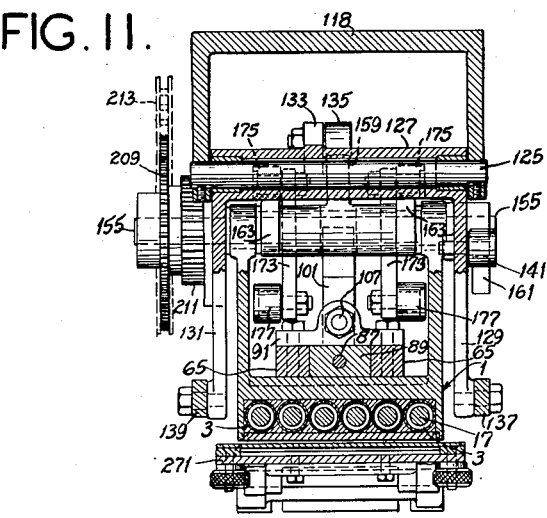
Fig. 11 is a vertical transverse section taken substantially on line 11—11 of Fig. 5.

The platen 271 is fixed to the bottom edges of depending side flanges 283 of the carriage 63 so as to provide a paper passage 285 between the carriage and the platen (see Figs. 9 and 14). The flanges 283 also serve as side guides for the paper. The pivots by means of which links 137 and 139 are coupled to the carriage are indicated at 286. The rocking abutment 111 previously referred to is pivotally mounted by means of pivot pins 287 fixed in the side flanges. The abutment is formed with rearwardly extending clamp arms 289. At the rearward free ends of these arms are bolts 291 having heads 293 below the arms provided with resilient paper-gripping pads 295. The paper P feeds off the roll R around a guide roll 297 mounted at its ends in slides 299 which are horizontally slidable longitudinally of the apparatus in guideways 301 in the pedestals 69. The roller 297 is located at the rearward ends of these slides. From the guide roll 297 the paper passes under a pawl-type paper stop or gripper 303 pivoted at its ends in the slides 299 forward of the roll 297. The paper extends over the platen 271 under the pads 295, under the arms 289 and through the paper passage 285, under the mold, under the blade 281, and on to the apron 275. A long spring finger 305 may be provided for holding the paper down against the platen 271. As shown, this finger extends forward from the slides 299.

At 307 is shown a lever for moving the slide 299 forward and rearward in its guideways 301. This lever is pivoted for rocking movement on a rod 309 which is fixed at its ends in the pedestals 69. The rod 309 extends through an elongate slot 311 in the lever to permit the lever to be lifted, as well as to permit the lever to rock. The lower end of the lever 307 is forked as indicated at 313 for engagement with a rod 315 fixed at its ends in a U-shaped bracket 317 which connects the two slides 299 together. The arrangement is such that when the lever 307 rocks clockwise from its position shown in Figs. 2 and 2-A, slides 299 are moved rearward, and when it rocks counterclockwise, slides 299 are moved forward.

The lever 307 is biased to rock clockwise as viewed in Figs. 2, 2-A and 5 by a leaf spring 319. It is adapted to be rocked counterclockwise as viewed in Figs. 2, 2-A and 5 against the bias of the spring by a paper length control screw 321 which is adjustably threaded in the carriage 63 and which extends rearward therefrom above the rod 87. Screw 321 is adapted to be locked in adjusted position by a lock nut 323. The screw 321 is adjusted as to position so that, whenever the carriage is retracted, the screw engages the lever 307 before the carriage is stopped by the stop nut 83, and rocks the lever 307 counterclockwise from its Fig. 5 position to its Fig. 2 and Fig. 2-A position against the bias of the spring 319. This moves the slide 299 and the gripper 303 forward, and the gripper advances the paper forward underneath the pads 295 (which are raised at this time) a distance corresponding to the adjustment of the screw 321, which is made such as to compensate for the increased length of the sausages due to the meat expansion.

With the carriage 63 in the rearward position shown in Figs. 2 and 2-A, the platen 271 is retracted. The plungers 5 hold the abutment 111 rocked back against the bias of the spring 113, and the arms 289 are thereby rocked down so that the paper is clamped against the platen by the pads 295 on the heads of the bolts 291. When the plungers move the carriage backward the further slight distance resulting from expansion of meat in the mold cavities upon release of the member 95, the slides 299 are advanced somewhat forward thereby to move the roll 297 and the gripper 303 forward. While this puts a slight bend in the paper (which is clamped to the platen at this time), this is of no concern as the bend is eliminated when the carriage moves forward. When the carriage is moved forward to its advanced position, the paper is clamped to the platen by the pads and a length of paper is pulled from the roll R. This length of paper will correspond to the length of the sausages that have been molded, including the extra portion of the length of the sausages occasioned by the allowance for expansion of meat in the mold cavities. When the carriage returns to its retracted position, the abutment 111, moving away from the cross bar 19, is rocked clockwise as viewed in Fig. 5 by the spring 113, thereby to lift the paper clamp arms 289 and release the paper. Thus, upon the return movement of the carriage, the paper is not moved back, and is effectively prevented from moving back by the gripper 303.

The knife 279 is mounted so as to be movable upward from a retracted position wherein its cutting edge is below the upper surface of the platen 271 into shearwise engagement with the fixed blade 281 to cut off the length of the paper which extends over the apron 275. As shown, the knife is mounted at the forward end of a knife holder 327 pivoted at 329 in brackets 331 fixed to the bottom of the platen. The knife holder extends forward from its pivotal axis, which extends transversely under the platen. A stud 333 extends down from the platen through an opening 335 in a cross bar 337 of the knife holder. A coil spring 339 surrounds the stud between the platen and the cross bar and another coil spring 341 surrounds the stud between the cross bar and a head 343 at the lower end of the stud. The springs normally maintain the holder and the knife in retracted position. Extending outward from the sides of the knife holder at its forward end are diamond-shaped cam follower members 345. These ride up on diamond-shaped cams 347 fixed on the insides of the sides of the U-shaped support 82 near the end of the forward movement of the platen, thereby to rock the knife holder and the knife upward through a cutting stroke, as illustrated in dotted lines in Fig. 2-A. Upon the return movement of the platen, the cam followers 345 ride under the fixed cams 347. The springs 399 and 341 permit this.

At 351 is shown the rearward end of an endless conveyor adapted to receive sausages ejected from the mold cavities upon a piece of paper on the apron 275, and carry away the sausages on the paper. This conveyor is mounted with the rearward end of its upper article-carrying reach, this reach travelling in the direction of the arrow shown in Figs. 2, 5 and 6, just under the level of the apron, and so positioned as to be under the apron when the platen is in its forward position. The conveyor extends in line with the dispensing apparatus, rather than crosswise thereof, and this is a very important feature to avoid any distortion of the sausages being ejected from the mold cavities. The member 82, as illustrated, is formed with slotted ears 353 for receiving bolts 355 to attach the conveyor to the mold.

Operation is as follows:

At the start of a molding and dispensing cycle, the operating elements of the apparatus are in their positions illustrated in Fig. 5. The carriage 63 is in its forward position, the plungers 15 are in their forward position wherein their forward ends are at the forward face of the mold, and the cam shaft 155, which is rotating at this time, is halfway through its one-revolution cycle. The slide valve 11 is in its lifted position, blocking slots 51, the forward ends of cavities 3 being fully open. The platen 271 is in its forward position, with the apron 275 forward of the forward end of the mold, and above the rearward end of the conveyor 351. Assuming that six sausages were molded in the mold cavities 3 in a preceding cycle of operation, these six sausages will have been ejected from the cavities and will lie on a piece of paper on the apron, this piece of paper having been cut off by the knife 279 acting in conjunction with the blade 281.

The sausage stuffer (not shown) supplies sausage meat under pressure through the stuffer cock (not shown), the pipe 37 and the fitting 29 to the chamber 9. Preferably, the meat is supplied at a temperature of 30° F. to have a good consistency for molding, but not so cold that it will undesirably discolor upon ejection from the mold. With the slide valve 11 in its lifted position blocking the slots 51, the meat is simply maintained in chamber 9 under pressure.

As the cam shaft 155 continues to rotate from its mid-position shown in Fig. 5, the rise 185 of the carriage return cam 161 engages the cam follower roller 141 on the lever 129 and swings the levers 129 and 131 clockwise as viewed in Fig. 5 positively to drive the carriage rearward. Plungers 15, however, remain in their forward position. Cam 161 drives the carriage rearward to the point where spring 143 takes over, whereupon the spring effects completion of the rearward travel of the carriage with a quick-return movement. The rise portions 189 of the slide valve actuating cams 163 engage the upper cam follower rollers 175 on the levers 165, and rock these levers clockwise as viewed in Fig. 5. This drives the slide valve 11 downward to its lowered position. As the levers 165 rock clockwise, the roller 179 carried thereby engages the rearward cam edge 105 and then the cam edge 103 of the finger 101 on the member 95, and moves the member 95, the block 89 and the rod 87 forward to the position illustrated in Figs. 2 and 2-A. This advances the stop nut 83 to its forward Fig. 2-A position, and the carriage is held in an initial rearward position corresponding to this forward position of the stop nut.

Also, as the carriage 63 moves rearward, the platen 271, which is secured to the carriage, moves rearward therewith to the position shown in Figs. 2 and 2-A. The apron 275 recedes to the position under the mold shown in Figs. 2 and 2-A. In the course of the return movement of the carriage, the diamond-shaped cam follower members 345 ride under the fixed diamond-shaped cams 347. As the apron recedes under the mold, the piece of paper and the sausages on the apron slide off onto the conveyor, which carries the sausages on the piece of paper away from the mold for packaging. It will be understood that the conveyor may extend the length of a packing table, and packers may simply remove the sausages on the paper from the conveyor and pack them in boxes or in any other suitable type of package.

As the carriage moves rearward away from the cross bar 19 at the rearward ends of the plungers 15, which remain in their Fig. 5 position, the abutment 111 is released so that it rocks clockwise under the bias of the spring 113. This swings the arms 289 and the paper grippers 295 upward to release the paper relative to the platen (see dotted position Fig. 2-A). With the paper stop or gripper 303 preventing the paper from moving rearward as the platen moves rearward, the paper extending over the platen remains stationary even though the platen moves back, except for the action of screw 321 and lever 307 to push forward the paper the distance to compensate for meat expansion. Thus, when the platen reaches an initial retracted position, as determined by engagement of the carriage 63 with the stop nut 83, an end portion of the paper corresponding in length to the distance the carriage and platen have travelled rearward plus the distance allowed for meat expansion extends from the edge of the knife blade 281 forward over the apron 275.

With the valve 11 moved to its lowered Fig. 2-A mold-filling position (the valve also now acting as a head closing the forward ends of the cavities 3), meat flows from chamber 9 through the slots 51 and the valve cavity 61 into the mold cavities at a rate dependent upon the setting of the stuffer cock. The cock may be adjusted to vary this rate as desired. The higher the rate of flow of meat, the more rapid the rate of production of sausages. The meat entering through the forward ends of the mold cavities 3 forces the plungers 15 rearward. Since the plungers are tied together by the bar 19, they all move rearward together in unison. Also, since the carriage 63 is in its retracted position, the plungers can move rearward freely. The speed of rotation of the cam shaft 155 is such that the one-revolution clutch through which the cam shaft is driven disengages before the plungers are completely retracted, and the cam shaft is stopped with the cams in the angular position shown in Figs. 2 and 2-A. As previously mentioned, rotation of the cam shaft is stopped by the action of the finger 229 coming into engagement with the pawl lifting element 231 and raising the pawl 223 out of engagement with the ratchet 211.

In the course of the rearward movement of the plungers 15 as they are driven back by the meat, ultimately the switch-actuating screw 259 engages the operating button 257 of the switch 253, and closes the switch. This effects energization of the solenoid 247, which in turn effects retraction of the pawl-lifting element 231 from under the finger 229. Thereupon the pawl 223 is biased by the spring 227 into engagement with the ratchet, and rotation of the cam shaft 155 through another revolution is re-instituted. As the cam shaft rotates from its at-rest position illustrated in Figs. 2 and 2-A, the initial effect is the engagement of the rise portions 189 of the slide valve actuating cams 163 with the lower cam follower rollers 177. This rocks the levers 165 counterclockwise as viewed in Figs. 2 and 2-A and lifts the valve member 11. As the valve member is raised, it passes through an intermediate position wherein, while still blocking the forward ends of the mold cavities 3, it also blocks off the slots 51 to cut off the supply of meat through the slots to the cavities. As the valve travels through this position, it thus confines the meat in the chamber 9 and also confines the meat in the cavities 3. Also, as the valve member travels through this position, the roller 179 carried by the levers 165 is lifted out of engagement with the finger 101, thereby releasing the member 95, the block 89, the rod 87, and the stop nut 83 on the rod 87 for rearward movement. As soon as the finger 101 has been released, the pressure of the meat in the mold cavities 3 (which are closed at their forward ends by valve member 11) effects a further slight rearward movement of the plungers 15 to the extent determined by the pressure of the meat in the mold cavities, and this allows the carriage 63 to move further rearward to a final retracted position. This additional rearward movement is completed before the valve member has passed out of its intermediate position in which it blocks the forward ends of the mold cavities. Thus, the bodies of meat molded in the cavities 3 are relieved of pressure before the cavities are opened at their forward ends. This eliminates any possibility of the pressure of the molded bodies of meat in the cavities causing an expansion of the meat out through the open forward ends of the cavities before the plungers 15 start to drive the molded bodies out of the cavities, thereby effectively avoiding the formation of any undesirable bulbous ends at the forward ends of the molded bodies. It will be understood that if the mold cavities were opened before the pressure of the bodies of meat therein were relieved, pressure of the meat might cause an expansion of the meat out through the open ends of the cavities with the resultant formation of undesirable bulbous ends. Thus, perfectly formed sausages are molded in the cavities 3, the length of each sausage being equal to the total distance which the carriage moved rearward (including the small rearward travel occurring upon meat expansion).

Following the operation of the meat expansion control means, the rise 181 of the carriage advancing cam 159 comes into engagement with the cam follower roller 135. This rocks the levers 129 and 131 counterclockwise from their Fig. 2-A position, and the levers 129 and 131 pull the carriage forward. As the carriage moves forward it drives the plungers forward to eject the molded bodies of meat from the mold cavities 3. Also, as the carriage moves forward, pressure engagement is maintained between the abutment 111 and the cross bar 19 at the rearward ends of the plungers, and this maintains the arms 289 and the pads 295 carried thereby in paper-gripping position. The result is that as the carriage moves forward, and as the platen 271 moves forward therewith, the paper is gripped between the pads 295 and the upper surface of the platen 271, and is fed forward with the platen. It will be understood that the length of the sausages is equal to the sum of the distance the plungers move rearward prior to release of the meat expansion control element 95 and the further distance which they move rearward in response to release of the meat expansion control element 95. The extra amount which the paper is pushed forward by the paper gripper 303 as the slides 299 are moved forward upon retraction of the carriage is in effect added onto the length of paper which is obtained simply by the rearward movement of the carriage. Otherwise, the length of paper which is fed forward might be somewhat shorter than the sausages which are ejected.

As the plungers are driven forward and eject the molded bodies of sausage meat from the mold cavities 3, the platen 271 moves forward at the same rate of speed as the plungers, and the apron 275 moves forward out from under the mold. The sausages being ejected from the mold cavities 3 are deposited upon the forward end portion of the paper on the apron which is moving forward with the platen 271. Here it will be recalled that as the carriage 63 is moving forward, pressure engagement is maintained between the abutment 111 and the cross bar 119 at the rearward end of the plungers 15 thereby to maintain the pads 295 gripping the paper to the platen. As the carriage 63 and the platen 271 near the forward limit of their forward motion, the diamond-shaped cam followers 345 ride up on the diamond-shaped cams 347, thereby raising the knife blade 279 and effecting shearing off of the forward end portion of the paper which extends over the apron against the fixed blade 281. The blade 281 is referred to as fixed because it is fixed to the platen. It will be noted that it moves with the platen. Ultimately, the operating elements of the apparatus again reach the position illustrated in Fig. 5, and then another cycle of operation begins.

It will be seen that the cycling of the apparatus is entirely dependent upon the rate of flow of sausage meat from the sausage stuffer to the mold, the faster the rate of flow of sausage, the faster the rate of cycling. If the rate of flow of sausage meat is high, the less time it takes for the plungers 15 to be pushed back from their forward positions and the more rapid the cycling, and vice versa.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Dispensing apparatus for moldable material comprising a stationary mold having a plurality of cavities therein open at one end, plungers freely slidable in the cavities, a stop located at the rear of the cavities engageable by the plungers for limiting rearward movement of the plungers away from the open ends of the cavities, a head associated with the mold mounted for movement between a position closing the open ends of the cavities and an open position, means associated with the mold having a passage for introducing moldable material from a supply under pressure into the cavities with the head closed to mold a body of the material in each cavity between the respective plunger and the head, said stop being mounted for movement in the direction of movement of the plungers, the plungers being movable rearward away from the open ends of the cavities by the moldable material introduced into the cavities until they engage the stop, means associated with the mold, the plungers and the head for successively effecting cutting off of the supply of material to the cavities, movement of the head to open position, and driving of the plungers forward from their retracted position to eject the molded bodies from the cavities, and means operatively associated with the stop and said moving means for releasably holding the stop in a forward position determining an initial retracted position of the plungers and acted upon by said head-moving means to release the stop for rearward movement from its forward position after cut-off of the supply and before opening of the head.

2. Dispensing apparatus for moldable material comprising a stationary mold having a cavity therein open at one end, a plunger freely slidable in the cavity, a stop located at the rear of the cavity for limiting rearward movement of the plunger away from the open end of the cavity, mold-filling means associated with the mold at said open end having a passage for introducing moldable material from a supply under pressure into the cavity through its open end to mold a body of the material therein under pressure between the plunger and the mold-filling means, said mold-filling means being mounted for movement between a mold-filling position against the mold at the open end of the cavity and a retracted position unblocking the open end of the cavity, said stop being mounted for movement in the direction of movement of the plunger, means associated with the mold-filling means and plunger for moving the mold-filling means to retracted position to cut off the supply of material and to unblock the open end of the cavity and then to drive the plunger forward to eject the molded body from the cavity, and means operatively associated with the stop and said moving means for releasably holding the stop in a forward position determining an initial retracted position of the plunger and acted upon by said moving means to release the stop for rearward movement from its forward position after cut-off of the supply and before unblocking of the open end of the cavity.

3. Dispensing apparatus for moldable material comprising a stationary mold having a plurality of cavities therein open at one end, plungers freely slidable in the cavities, a stop located at the rear of the cavities for limiting rearward movement of the plungers away from the open ends of the cavities, mold-filling means associated with the mold at said open ends having a passage for introducing moldable material from a supply under pressure into the cavities through their open ends to mold a body of the material under pressure in each cavity between the respective plunger and the mold-filling means, said mold-filling means being mounted for movement between a mold-filling position against the mold at the open ends of the cavities and a retracted position unblocking the open ends of the cavities, said stop being mounted for movement in the direction of movement of the plungers, the plungers being movable rearward away from the open ends of the cavities by the moldable material introduced into the cavities until they engage the stop, means associated with the mold-filling means and plungers for moving the mold-filling means to retracted position to cut off the supply of material to the cavities and to unblock the open ends of the cavities and then to drive the plungers forward to eject the molded bodies from the cavities, and means operatively associated with the stop and said moving means for releasably holding the stop in a forward position determining an initial retracted position of the plungers and acted upon by said moving means to release the stop for rearward movement from its forward position after cut-off of the supply and before unblocking of the open ends of the cavities.

4. Dispensing apparatus for moldable material comprising a stationary mold having a cavity therein open at one end, a plunger freely slidable in the cavity, a stop located at the rear of the cavity for limiting rearward movement of the plunger away from the open end of the cavity, a valve member associated with the mold and mounted for movement transversely across the open end of the cavity between a cavity-filling position and a retracted position unblocking said end, said valve member having a port for establishing communication from a source of moldable material under pressure to the open end of the cavity when in said cavity-filling position thereby to mold a body of the material in the cavity under pressure between the plunger and valve member, the valve member passing through an intermediate position wherein said communication is cut off while the open end of the cavity remains blocked as it moves from its cavity-filling to its retracted position, said stop being mounted for movement in the direction of movement of the plunger, means having operative connection with the valve member and plunger for moving the valve member to retracted position and then driving the plunger forward to eject the molded body from the cavity, and means operatively associated with the stop and said moving means for releasably holding the stop in a forward position determining an initial retracted position of the plunger and acted upon by said moving means to release the stop for rearward movement from its forward position as the valve member moves through its intermediate position in moving from its cavity-filling to its retracted position.

5. Dispensing apparatus for moldable material comprising a stationary mold having a plurality of cavities therein open at one end, plungers freely slidable in the cavities, a stop located at the rear of the cavities for limiting rearward movement of the plungers away from the open ends of the cavities, a valve member associated with the mold and mounted for movement transversely across the open ends of the cavities between a cavity-filling position and a retracted position unblocking said ends, said valve member having a port for establishing communication from a source of moldable material under pressure to the open ends of the cavities when in said cavity-filling position thereby to mold a body of the material in each cavity under pressure between the respective plunger and the valve member, said valve member passing through an intermediate position wherein said communication is cut off while the open ends of the cavities remain blocked as it moves from its cavity-filling to its retracted position, said stop being mounted for movement in the direction of movement of the plungers, the plungers being movable rearward away from the open ends of the cavities by the moldable material introduced into the cavities until they engage the stop, means having operative connection with the valve member and plungers for moving the valve member to retracted position and then driving the plungers forward to eject the molded bodies from the cavities, and means operatively associated with the stop and said moving means for releasably holding the stop in a forward position determining an initial retracted position of the plungers and acted upon by said moving means to release the stop for rearward movement from its forward position as the valve member moves through its intermediate position in moving from its cavity-filling to its retracted position.

6. Dispensing apparatus for moldable material comprising a stationary mold having a cavity extending completely therethrough from its rearward to its forward end, a plunger freely slidable in the cavity, a carriage mounted for movement toward and away from the rearward end of the mold and adapted to drive the plunger forward to eject a body of molded material from the cavity through its forward end, a stop located rearward of the carriage for limiting rearward movement of the carriage, mold-filling means associated with the mold at its forward end having a passage for introducing moldable material from a supply under presure into the cavity through its open end to mold a body of the material therein under pressure between the plunger and the mold-filling means, said mold-filling means being mounted for movement between a mold-filling position against the mold at its forward end and a retracted position unblocking the open end of the cavity, said stop being mounted for movement forward and rearward, mechanism associated with the mold-filling means and carriage for effecting operation of the apparatus through a cycle involving movement of the carriage to an initial retracted position determined by the stop, movement of the mold-filling means to mold-filling position to mold a body of the material in the cavity, the plunger being movable rearward by the material introduced into the cavity until stopped by the carriage, followed by movement of the mold-filling means to cut off the supply of material from the cavity and to unblock the open end of the cavity, and driving forward of the carriage to drive the plunger forward to eject the molded body from the cavity, and means operatively associated with said stop and said mechanism and controlled by said mechanism for releasably holding the stop in a forward position determining said initial retracted position of the carriage and acting to release the stop for rearward movement from its forward position after cut-off of the supply and before unblocking of the open end of the cavity.

7. Dispensing apparatus for moldable material comprising a stationary mold having a cavity extending completely therethrough from its rearward to its forward end, a plunger freely slidable in the cavity, a carriage mounted for movement toward and away from the rearward end of the mold and adapted to drive the plunger forward to eject a body of molded material from the cavity through its forward end, a stop located rearward of the carriage for limiting rearward movement of the carriage, a valve member associated with the mold and mounted for movement transversely across the open end of the cavity between a cavity-filling position and a retracted position unblocking said end, said valve member having a port for establishing communication from a source of moldable material under pressure to the open end of the cavity when in said cavity-filling position thereby to mold a body of the material in the cavity under pressure between the plunger and valve member, the valve member passing through an intermediate position wherein said communication is cut off while the open end of the cavity remains blocked as it moves from its cavity-filling to its retracted position, said stop being mounted for movement forward and rearward, mechanism associated with the valve member and carriage for effecting operation of the apparatus through a cycle involving movement of the carriage to an initial retracted position determined by the stop, movement of the valve member to cavity-filling position to mold a body of the material in the cavity, the plunger being movable rearward by the material introduced into the cavity until stopped by the carriage, followed by movement of the valve member to retracted position and driving forward of the carriage to drive the plunger forward to eject the molded body from the cavity, and means operatively associated with said stop and said mechanism and controlled by said mechanism for releasably holding the stop in a forward position determining said initial retracted position of the carriage and acting to release the stop for rearward movement from its forward position as the valve member passes through its said intermediate position.

8. Dispensing apparatus as set forth in claim 6 wherein the said mechanism is power driven and includes cam-controlled means operatively associated with the carriage, the mold-filling means and the stop holding means for effecting the retraction and driving forward of the carriage, movement of the mold-filling means, and release of the stop in proper timed relation.

9. Dispensing apparatus as set forth in claim 7 wherein said mechanism is power driven and includes cam-controlled means operatively associated with the carriage, the valve member and the stop holding means for effecting the retraction and driving forward of the carriage, movement of the valve member, and release of the stop in proper timed relation.

10. Dispensing apparatus as set forth in claim 6 wherein the said mechanism is power driven and includes cam-controlled means operatively associated with the carriage, the mold-filling means and the stop holding means for effecting the retraction and driving forward of the carriage, movement of the mold-filling means, and release of the stop in proper timed relation, and wherein the said cam-controlled means includes a cam shaft, a single-revolution clutch for driving the cam shaft, and means responsive to movement of the plunger to a retracted position as determined by its engagement with the retracted carriage for engaging the clutch for initiating revolution of the cam shaft through one revolution.

11. Dispensing apparatus as set forth in claim 7 wherein the said mechanism is power driven and includes cam-controlled means operatively associated with the carriage, the valve member and the stop holding means for effecting the retraction and driving forward of the carriage, movement of the valve member, and release of the stop in proper timed relation, and wherein the said cam-controlled means includes a cam shaft, a single-revolution clutch for driving the cam shaft, and means responsive to movement of the plunger to a retracted position as determined by its engagement with the retracted carriage for engaging the clutch for initiating revolution of the cam shaft through one revolution.

12. Dispensing apparatus for moldable material comprising a stationary mold having a cavity extending completely therethrough from its rearward to its forward end, a plunger freely slidable in said cavity limited in movement away from the open end of the cavity, a slide valve reciprocable transversely across the forward end of the mold across the forward end of the cavity between a cavity-filling position and a retracted position unblocking said end, said valve having a port for establishing communication from a source of moldable material under pressure to the forward end of the cavity when in cavity-filling position to mold a body of the material in the cavity, a carriage reciprocable toward and away from the rearward end of the mold and adapted to drive the plunger forward to eject a body of molded material from the cavity through its forward end, mechanism including a cam shaft carrying cams and operative connections between the cams and the carriage and valve for effecting forward and rearward movement of the carriage and movement of the valve, a power-operated drive for the cam shaft including a one-revolution clutch, and means associated with the plunger and clutch responsive to movement of the plunger to a retracted position to engage the clutch.

13. Dispensing apparatus for moldable material comprising a stationary mold having a cavity extending compeltely therethrough from its rearward to its forward end, a plunger freely slidable in said cavity limited in movement away from the open end of the cavity, a slide valve reciprocable transversely across the forward end of the mold across the forward end of the cavity between a cavity-filling position and a retracted position unblocking said end, said valve having a port for establishing communication from a source of moldable material under pressure to the forward end of the cavity when in cavity-filling position to mold a body of the material in the cavity, a carriage reciprocable toward and away from the rearward end of the mold and adapted to drive the plunger forward to eject a body of molded material from the cavity through its forward end, mechanism including a cam shaft carrying cams and operative connections between the cams and the carriage and valve for effecting forward and rearward movement of the carriage and movement of the valve, a power-operated drive for the cam-shaft including a one-revolution clutch, electromagnetic means controlling the clutch, said electromagnetic means being connected in a circuit including a switch carried by the carriage, said switch being actuated by the plunger upon movement thereof to a retracted position to effect engagement of the clutch.

14. Dispensing apparatus for moldable material comprising a stationary mold having a cavity extending completely therethrough from its rearward to its forward end, a plunger freely slidable in said cavity, a slide valve reciprocable transversely across the forward end of the mold across the forward end of the cavity between a cavity-filling position and a retracted position unblocking said end, said valve having a port for establishing communication from a source of moldable material under pressure to the forward end of the cavity when in cavity-filling position to mold a body of the material in the cavity, a carriage reciprocable toward and away from the rearward end of the mold and adapted to drive the plunger forward to eject a body of molded material from the cavity through its forward end, a stop located rearward of the carriage determining a retracted position of the carriage, said stop being mounted for movement forward and rearward, mechanism including a cam shaft carrying cams and operative connections between the cams and the carriage and valve and stop for effecting forward and rearward movement of the carriage and movement of the valve, and for releasably holding the stop in a forward position and acting to release the stop for rearward movement from its forward position upon movement of the valve member toward its retracted position, a power-operated drive for the cam shaft including a one-revolution clutch, and means associated with the plunger and clutch responsive to movement of the plunger into engagement with the carriage when the latter is in retracted position to engage the clutch.

15. Apparatus for making skinless sausages of link sausage form, comprising a stationary mold having a mold cavity for molding sausage meat into links, one link at a time, said cavity being open at one end, a plunger freely slidable in the cavity, a movable stop located at the rear of the cavity for limiting rearward movement of the plunger away from the open end of the cavity, means associated with the stop releasably holding the stop in an initial position determining an initial retracted position of the plunger wherein its forward end is spaced from the said end of the cavity a distance slightly less than the final length of the link to be molded, means associated with the mold for closing the open end of the cavity and filling the cavity with sausage meat from a supply under pressure to mold a body of sausage confined under pressure in the cavity between the plunger and the closure at said end of the cavity, and means associated with the closing and filling means, the release means and the plunger operative upon completion of filling of the cavity successively to cut off the supply, actuate the release means for the stop to allow a slight further rearward movement of the plunger thereby to allow for expansion of the body of sausage meat in the cavity to relieve it of pressure, open the cavity, and then drive the plunger forward to eject the molded link from the cavity.

16. Apparatus for making skinless sausages of link sausage form, comprising a stationary mold having a plurality of mold cavities for molding sausage meat into links, one link in each cavity at a time, said cavities being open at one end, plungers freely slidable in the cavities, a movable stop located at the rear of the cavities for limiting rearward movement of the plungers away from the open ends of the cavities, means associated with the stop releasably holding the stop in an initial position determining an initial retracted position of the plungers wherein their forward ends are spaced from the said ends of the cavities a distance slightly less than the final length of the links to be molded, means associated with the mold for closing the open ends of the cavities and filling the cavities with sausage meat from a supply under pressure to mold a body of sausage confined under pressure in each cavity between the respective plunger and the closure at said end of the cavities, and means associated with the closing and filling means, the release means and the plungers operative upon completion of filling of the cavities successively to cut off the supply, actuate the release means for the stop to allow a slight further rearward movement of the plungers thereby to allow for expansion of the bodies of sausage meat in the cavities to relieve them of pressure, open the cavities, and then drive the plungers forward to eject the molded links from the cavities.

17. Apparatus for making skinless sausages of link sausage form, comprising a stationary mold having a mold cavity for molding sausage meat into links, one link at a time, said cavity being open at one end, a plunger freely slidable in the cavity, a rod mounted for sliding movement generally parallel to the plunger, a stop carried by the rod and adjustable thereon for adjustably limiting rearward movement of the plunger away from the open end of the cavity, means adjacent the rod releasably holding the rod with the stop in an initial position determining an initial retracted position of the plunger wherein its forward end is spaced from the said end of the cavity a distance slightly less than the final length of the link to be molded, means associated with the mold for closing the open end of the cavity and filling the cavity with sausage meat from a supply under pressure to mold a body of sausage confined under pressure in the cavity between the plunger and the closure at said end of the cavity, and means associated with the closing and filling means, the release means and the plunger operative upon completion of filling of the cavity successively to cut off the supply, actuate the release means for the rod to allow a slight further rearward movement of the plunger thereby to allow for expansion of the body of sausage meat in the cavity to relieve it of pressure, open the cavity, and then drive the plunger forward to eject the molded link from the cavity.

18. Apparatus for making skinless sausages of link sausage form, comprising a stationary mold having a mold cavity for molding sausage meat into links, one link at a time, said cavity extending completely through the mold from its rearward to its forward end, a plunger freely slidable in the cavity, a carriage movable toward and away from the rearward end of the mold and adapted to drive the plunger forward to eject a sausage from the cavity through its forward end, a movable stop located rearward of the carriage for limiting rearward movement of the carriage and hence limiting rearward movement of the plunger away from the forward end of the cavity, means associated with the stop releasably holding the stop in an initial position determining an initial retracted position of the carriage and the plunger wherein the forward end of the plunger is spaced from the forward end of the cavity a distance slightly less than the final length of the link to be molded, means associated with the mold for closing the open end of the cavity and filling the cavity with sausage meat from a supply under pressure to mold a body of sausage confined under pressure in the cavity between the plunger and the closure at said end of the cavity, and means associated with the closing and filling means, the release means and the carriage operative upon completion of filling of the cavity successively to cut off the supply, actuate the release means for the stop to allow a slight further rearward movement of the carriage and plunger thereby to allow for expansion of the body of sausage meat in the cavity to relieve it of pressure, open the cavity, and then drive the carriage and plunger forward to eject the molded link from the cavity.

19. Apparatus for making skinless sausages of link sausage form, comprisig a stationary mold having a plurality of mold cavities extending horizontally parallel to one another and side-by-side for molding sausage meat into links, one link in each cavity at a time, said cavities being open at one end, plungers freely slidable in the cavities, a movable stop located at the rear of the cavities for limiting rearward movement of the plungers away from the open end of the cavities, means associated with the stop releasably holding the stop in an initial position determining an initial retracted position of the plungers wherein their forward ends are spaced from the said ends of the cavities a distance slightly less than the final length of the links to be molded, means associated with the mold for closing the open ends of the cavities and filling the cavities with sausage meat under pressure from a source of supply under pressure to mold a body of sausage confined under pressure in each cavity between the repective plunger and the closure at said end of the cavities, means associated with the closing and filling means, the release means and the plungers operative upon completion of filling of the cavities successively to cut off the supply, actuate the release means for the stop to allow a slight further rearward movement of the plungers thereby to allow for expansion of the bodies of sausage meat in the cavities to relieve them of pressure, open the cavities, and then drive the plungers forward to eject the molded links from the cavities, and means movable forward with the plungers for feeding the end portion of a strip of paper into position under the sausages being ejected and to cut off a piece of the paper corresponding in length to the length of the expanded bodies of sausage meat.

20. Apparatus for making skinless sausages of link sausage form, comprising a stationary mold having a plurality of elongate cylindrical mold cavities extending therethrough horizontally parallel to one another and side-by-side from the rearward to the forward end of the mold, plungers freely slidable in the cavities and extending out of the rearward ends of the cavities, said plungers having an advanced position wherein their forward ends are at the forward end of the mold, a carriage mounted for movement in the direction of movement of the plungers toward and away from the rearward end of the mold and adapted to engage and drive the plungers forward to their advanced position, a stop located rearward of the carriage for limiting rearward movement of the carriage, said stop being mounted for movement in the direction of movement of the carriage, a valve member associated with the mold and mounted for movement vertically across the open ends of the cavities between a lowered cavity-filling position and a raised retracted position unblocking the open ends of the cavities, said valve member having a port for establishing communication from a source of sausage meat under pressure to the open ends of the cavities when in said lowered position, and passing through an intermediate position wherein said communication is cut off while the open ends of the cavities still remain blocked as it is raised, means movable with the valve member and operatively associated with the stop for holding the stop in a forward position determining an initial retracted position of the carriage and acting to release the stop for rearward movement as the valve member passes through its said intermediate position in being raised, and mechanism operatively associated with the carriage and valve member for effecting operation of the apparatus through a cycle involving: first, rearward movement of the carriage to said initial retracted position; second, movement of the valve member to its lowered cavity-filling position; third, filling of the cavities with sausage meat, the meat pushing the plungers rearward until they are stopped by the carriage; fourth, movement of the valve member to its lifted, retracted position, in the course of which the stop is released to allow the meat in the cavities to expand; and fifth, forward movement of the carriage to push the plungers forward to their advanced position thereby to eject the sausages from the cavities.

21. Apparatus as set forth in claim 20, further comprising a platen movable with the carriage under the mold adapted to extend forward from the mold when the carriage drives the plungers to their advanced position, paper gripping means carried by the carriage adapted to grip a strip of paper against the platen upon forward movement of the carriage to feed the paper forward, and to release the paper upon rearward movement of the carriage, cutting means under the mold operable upon movement of the plungers to advanced position to cut off the end portion of the paper, and means rearward of the mold operated by the carriage upon rearward movement thereof for feeding forward an additional length of the paper corresponding to the distance which the carriage moves rearward due to expansion of the meat.

22. Apparatus as set forth in claim 20, wherein said mechanism for effecting operation of the apparatus through a cycle includes power driven means to set into operation in response to rearward movement of the plungers to their retracted position determined by engagement with the carriage when the latter is in its said initial retracted position, and terminating in operation upon completion of rearward movement of the carriage to its said initial retracted position and movement of the valve member to its lowered cavity-filling position, the power means being out of operation during the interval in which the meat is pushing the plungers rearward.

23. In a dispensing apparatus for forming moldable material into molded bodies and dispensing the molded bodies comprising a stationary mold having a mold cavity therein conforming to the desired shape for a molded body and being open at one end, this end constituting the forward end of the cavity, means associated with the mold for introducing moldable material from a supply under pressure into the cavity with its said forward end closed, a plunger freely slidable in the cavity and movable rearward in the cavity by the material introduced into the cavity, mechanism associated with the mold and operable on said means and on the plunger for successively effecting cutting off of the supply of the material to the cavity, opening of the forward end of the cavity, and movement of the plunger forward toward the forward end of the cavity to eject a molded body from the cavity, said dispensing apparatus having a stop located for engagement by the plunger for limiting the rearward movement of the plunger, said stop being mounted for movement to release the plunger, and a control for the stop actuated by said mechanism to hold the stop in a position determining an initial rearward position of the plunger while the cavity is being filled with material and to release the stop to release the plunger for further rearward movement from its said initial rearward position after cutoff of the supply and before the forward end of the cavity is opened to allow the body of material in the cavity to expand rearward substantially to relieve it of pressure before the forward end of the cavity is opened.

24. In a dispensing apparatus as set forth in claim 23, said mechanism including power-driven means for operating the apparatus through a cycle involving, in succession, cutting off of the supply of material to the cavity, release of the stop to relieve a molded body in the cavity of pressure, opening of the forward end of the cavity, forward movement of the plunger to eject the molded body from the cavity, and closure of the forward end of the cavity and introduction of moldable material into the cavity, and further including means actuated by the plunger in response to movement thereof to its said initial rearward position by material introduced into the cavity for initiating operation of said power-driven means through a cycle, the power-driven means being out of operation during the interval in which the material is pushing the plunger rearward.

References Cited in the file of this patent

UNITED STATES PATENTS

| Number | Name | Date |
| --- | --- | --- |
| 994,714 | Boyle | June 13, 1911 |
| 1,925,157 | Vogt | Sept. 5, 1933 |
| 1,942,582 | Vogt | Jan. 9, 1934 |
| 2,011,989 | Vogt | Aug. 20, 1935 |
| 2,013,610 | Karpiloff | Sept. 3, 1935 |
| 2,299,314 | Elesh et al. | Oct. 20, 1942 |
| 2,500,973 | Ackerman | Mar. 21, 1950 |
| 2,528,234 | Lilien | Oct. 31, 1950 |
| 2,530,061 | Holly | Nov. 14, 1950 |
| 2,530,062 | Holly | Nov. 14, 1950 |

FOREIGN PATENTS

| Number | Country | Date |
| --- | --- | --- |
| 293,638 | Germany | Aug. 21, 1916 |